United States Patent [19]

Senda et al.

[11] 4,374,676
[45] Feb. 22, 1983

[54] HEAT STABLE YELLOW IRON OXIDES CONTAINING ANTIMONY

[75] Inventors: Jihei Senda; Yoshihiro Inoue; Toshiaki Uenishi, all of Ube; Hidefumi Harada, Yamaguchi; Kouji Nakata, Ube; Akio Akagi, Ube; Takanori Yamasaki, Ube, all of Japan

[73] Assignee: Titan Kogyo K.K., Japan

[21] Appl. No.: 327,868

[22] Filed: Dec. 7, 1981

Related U.S. Application Data

[63] Continuation-in-part of Ser. No. 154,570, May 29, 1980, abandoned.

[30] Foreign Application Priority Data

May 30, 1979 [JP] Japan ................................. 54-66103

[51] Int. Cl.$^3$ .......................... C01G 49/02; C09C 1/24
[52] U.S. Cl. ................................. 106/303; 106/304; 106/308 B; 106/309; 423/617; 423/633; 427/218; 428/403
[58] Field of Search ..................... 106/303, 304, 308 B, 106/309; 423/617, 633; 427/218; 428/403

[56] References Cited

U.S. PATENT DOCUMENTS

| | | | |
|---|---|---|---|
| 3,946,103 | 3/1976 | Hund | 106/304 |
| 3,969,494 | 7/1976 | Nobuoka et al. | 423/633 |

FOREIGN PATENT DOCUMENTS

49-16531 4/1974 Japan .

Primary Examiner—Mark Bell
Attorney, Agent, or Firm—George L. Rushton

[57] ABSTRACT

Yellow iron oxide pigments having improved heat stability are prepared by mixing a conventional yellow iron oxide pigment with an aqueous alkaline solution of a soluble antimony compound. This yields a yellow pigment whose particle surface is coated with "antimony-bloom", and this product has a higher heat stability temperature than does the starting yellow iron oxide. When the product coated with "antimony-bloom" is subjected to hydrothermal treatment (autoclaving), the resultant material has a yet-higher heat stability temperature. Other, related treatments furnish products with improved heat stability temperatures.

14 Claims, No Drawings

HEAT STABLE YELLOW IRON OXIDES CONTAINING ANTIMONY

BACKGROUND OF THE INVENTION

This is a continuation-in-part of our co-pending application, Ser. No. 154,470, filed May 29, 1980, now abandoned.

The present invention relates to an antimony containing, heat stable, yellow iron oxide pigment and to a process for the production thereof.

Yellow iron oxide pigments now find a growing use as substitutes for other yellow pigments, such as chromium yellow, cadmium yellow and benzidine yellow. However, since yellow iron oxide has a lower heat stability temperature then the other yellow pigments, the range of its use as a substitute is restricted, so that an improved yellow iron oxide pigment showing better heat resistance is desired.

The inventors have carried out research to improve the heat stability of yellow iron oxide and have found that a heat resistance compared to that attained previously by hydrothermal treatment can be achieved *without* employing hydrothermal treatment, when the particle surface of yellow iron oxide is coated with antimony-bloom ($\alpha$-$Sb_2O_3$) at a temperature of at most 100° C. under atmospheric pressure. They have also found that the heat resistance of yellow iron oxide can be improved by subjecting the above-mentioned yellow iron oxide coated with $\alpha$-$Sb_2O_3$ to a hydrothermal treatment, or by treating a yellow iron oxide coated with a colloidal precipitate of a ferric salt to a hydrothermal treatment in an aqueous solution containing an antimony compound, in order to form a compound or solid solution based on iron/antimony over the surface of yellow iron oxide particle. These improvements are the bases of the present invention.

In Japanese Patent Publication No. 16531/1974, a particular method for improving the properties of a pigment has been proposed. This method consists of treating a pigment together with one, or more, water soluble metal compounds in an autoclave to coat the particle surface of the pigment with the metal oxide derived from said one or more metal compounds. The inventors of Japanese Patent Publication No. 16531/74 had attempted to attain an improvement of yellow iron oxide by adopting this proposed method. What resulted was a heat stability not as high as expected.

The present inventors have therefore sought various other measures for attaining an improvement of heat resistance of yellow iron oxide and have discovered, as mentioned previously;

(1) that a heat resistance comparable to that attained by a hydrothermal treatment as disclosed in Japanese Patent Publication No. 16531/1974 can be achieved *without* employing hydrothermal treatment, when the particle surface of yellow iron oxide is coated with an oxide of antimony, i.e. antimony-bloom ($\alpha$-$Sb_2O_3$), at a temperature not higher than 100° C. under normal pressure, (2) that the heat resistance of the yellow iron oxide treated by said antimony oxide coating will be increased, when the so-coated yellow iron oxide is subjected to a hydrothermal treatment in an aqueous solution existing in such a pH range that all of the antimony-bloom coating will not be re-dissolved by the heating and pressurizing condition employed, resulting in the formation of a compound or a solid solution based on iron/antimony, and (3) that the heat stability of a yellow iron oxide coated with a colloidal precipitate of a ferric salt will be increased to a greater extent when this coated product is subjected to a hydrothermal treatment in an aqueous solution containing an antimony compound, so as to form a compound or a solid solution based on iron/antimony over the particle surface of yellow iron oxide.

The yellow iron oxide pigment, with the particle surface coated with antimony-bloom, was formed, as mentioned above, by dispersing yellow iron oxide in an aqueous solution of an antimony (III) salt and subsequently hydrolyzing the antimony salt, without employing the heating treatment under pressure as described in Japanese Patent Publication No. 16531/1974. This fact may be due to the reasons:

(1) that yellow iron oxide ($\alpha$-FeOOH) and antimony-bloom belong to the same crystal system (rhombic crystal), and antimony-bloom can be formed by a hydrolysis of an antimony (III) salt (cf. "Synthesis of Inorganic Compounds - - - 1": Shin-Jikken Kagaku Koza 8; edited by the Chemical Society of Japan, issued from Maruzen K.K.), and (2) that the lattice constants are: $a_o=4.60$ Å, $b_o=10.00$ Å, $c_o=3.03$ Å for yellow iron oxide, and $a_o=4.92$ Å, $b_o=12.46$ Å, $C_o=5.42$ Å for antimony-bloom, and their crystal forms are needlelike or prismatic, as reported (cf. Palache, L. G., Berman, H., and Frondel, C.: "The System of Mineralogy", 7th Ed. Vol. 1; John Wiley and Sons, New York—1944).

It was assumed that the reason for the use of hydrothermal treatment at a temperature higher than the decomposition temperature, 210° C., of naked yellow iron oxide in hot water resides in the fact that the antimony-bloom-coated iron oxide pigment is protected by the stable crystal of antimony-bloom.

SUMMARY OF THE INVENTION

The present invention has several aspects concerning the use of antimony in the preparation of heat stable yellow iron oxide pigments. One aspect of the invention concerns the mixing of conventional yellow iron oxide pigment with an aqueous alkaline solution of a soluble antimony compound. Processing of this mixture yields a yellow iron oxide pigment whose particle surface is coated with a form of antimony oxide known as "antimony-bloom". The resultant product shows a higher heat stability temperature than does the original starting material.

Another aspect of the invention concerns the use of the product of the previous paragraph, yellow iron oxide having a coating of antimony-bloom, as the starting material involved in a hydrothermal treatment. The product from this treatment has a higher heat stability temperature than does the yellow iron oxide coated with antimony-bloom.

Another aspect of the invention involves the dispersion of the yellow iron oxide coated with antimony-bloom in an aqueous solution of sodium silicate (or stannate), with this resultant dispersion subjected to hydrothermal treatment. The product from this treatment has a higher heat stability temperature than does the yellow iron oxide coated with antimony-bloom.

A further aspect of the invention concerns the dispersion formed by mixing commercial yellow iron oxide, an alkaline solution of an antimony oxide, and a soluble ferric salt. This dispersion, subjected to hydrothermal treatment, produces a product having a heat stability temperature higher than that of the conventional yellow iron oxide used as a starting material.

In another aspect of the invention, yellow iron oxide coated with antimony-bloom, in a dilute alkaline suspension, was subjected to hydrothermal treatment, at a "low" temperature. The product from this treatment was then subjected to a second hydrothermal treatment, at a "high" temperature. The ultimate product had a heat stability temperature higher than that of the original starting material, the antimony-coated yellow iron oxide.

A further aspect of the invention concerns the first step of subjecting commercial yellow iron oxide to a hydrothermal treatment in dilute alkaline solution. This product is then dispersed in a mixture of a soluble ferric salt and a soluble antimony compound. The resultant slurry was subjected to a second hydrothermal treatment, with the ultimate product having a heat stability temperature higher than that of the the starting material, the yellow iron oxide that had been subjected to hydrothermal treatment in dilute alkaline solution.

A further aspect of the invention concerns a composition of α-FeOOH having at least a partial film or coating of (FeSb)OOH solid solution.

DETAILED DESCRIPTION OF THE PREFERRED EMBODIMENTS

The starting material for the preparation of the heat stable material is a conventional yellow iron oxide pigment (α-FeOOH). An aqueous dispersion of yellow iron oxide is formed by mixing solid yellow iron oxide with water so that the composition is from about 30 to about 200 parts yellow iron oxide per 1,000 parts water.

Added to the aqueous dispersion of yellow iron oxide is an aqueous alkaline solution of a soluble compound of antimony, preferably an alkali metal salt of antimony, so that this mixture has an antimony equivalent of about 0.03 to 20 parts antimony trioxide (preferably about 0.15 to 10 parts), about 40 to 80 parts alkali metal hydroxide and about 400 parts water. Soluble compounds of antimony in the form of alkali metal antimonites, such as sodium antimonite and potassium antimonite, are prepared by mixing and dissolving antimony compound such as antimony trioxide in sufficient alkali metal hydroxide. Other antimony compounds that can be used in the reaction with alkali metal hydroxide are $SbCl_3$, $SbF_3$, and $Sb_2(SO_4)_3$. The amount of antimony compound, calculated as $Sb_2O_3$, used in the reaction with alkali metal hydroxide varies from about 0.1 to about 10 wt.% based on the yellow iron oxide although the preferred range is 0.5 to 5 wt.%. The preferred alkali metal hydroxide is sodium hydroxide, a convenient and commercially available alkali. The carbonate of sodium and/or potassium can be added as alternatives to the alkali metal hydroxide, in order to produce a hydrolysis reaction thereby insuring that enough hydroxide ions are present to keep the antimony salt soluble. The pH of the system is greater than 10, preferably 12 or 13.

The resultant mixture of yellow iron oxide in an aqueous alkaline solution of an antimony compound is then diluted with water in a volume ranging from about 1.2 to about 5 volumes per original volume of mixture prior to dilution. The resultant products are separated into solid and aqueous phases, and the solid phase is recovered by standard techniques such as filtering, washing and drying. The reaction temperature is less than 100° C. during these above steps.

Heat resistance of the antimony-treated yellow iron oxide pigment is further increased by hydrothermal treatment. An aqueous dispersion of antimony-treated yellow iron oxide is formed by adding water so that the composition of the dispersion is about 30 to 200 parts antimony-treated yellow iron oxide per 1,000 parts water. The aqueous dispersion is then subjected to hydrothermal treatment, which comprises heating the reactant mixture (or slurry) under autogenous pressure, using apparatus such as an autoclave. It is difficult to asign a definite temperature or temperature range to the various hydrothermal treatments due to the variety of starting materials used. As noted in the examples, the reaction parameters vary as do the hydrothermal treatments. Basically, the treatments can have temperatures ranging from about 100° C. to about 350° C., with treatment times of over 30 minutes, such as from about 1 to about 5 hours. After hydrothermal treatment the solid product is then recovered by conventional separation techniques.

As even further increase in yellow iron oxide heat resistance is obtained by adding a soluble alkali metal silicate and/or alkali metal stannate to the antimony-treated yellow iron oxide prior to hydrothermal treatment. The preferable alkali metal silicate is sodium silicate, and the preferable alkali metal stannate is sodium stannate. The amount of silicate or stannate (as $SiO_3^{-2}$ as an $SnO_3^{-2}$) varies from about 0.3 to about 5 wt.%, based on yellow iron oxide. It is believed the addition of soluble silicate or stannate compounds aid in the suppression of α-$Fe_2O_3$. α-$Fe_2O_3$ formation results in a degradation of the color of the yellow iron oxide pigment.

An alternate method of forming heat stable yellow iron oxide involves the addition of a soluble ferric salt to an aqueous dispersion of yellow iron oxide, followed by the addition of an alkaline solution of antimony-treated yellow iron oxide, resulting in a mixture having about 30 to 200 parts yellow iron oxide, about 5 to 15 parts alkali metal hydroxide for each part of antimony oxide used, the antimony equivalent of about 20 to 100 parts antimony oxide, and from about 1 to about 100 parts ferric salt, per 1,000 parts water. The soluble ferric salt that is preferred is ferric sulfate, although other ferric salts which are soluble in water, such as ferric chloride, ferric nitrate, ferric oxalate and ferric thiocyanate, can be used. The amount of antimony compound used, calculated as $Sb_2O_3$, varies from about 35 to about 150 wt.%, based on the soluble ferric salt.

The resultant mixture is then subjected to hydrothermal treatment, carried out at a temperature from about 100° C. to about 240° C. for a time greater than ½ hour, preferably from about 1 to about 4 hours.

Adding a soluble alkali metal silicate or alkali metal stannate, preferably sodium silicate or sodium stannate to antimony/ferric salt-treated yellow iron oxide prior to hydrothermal treatment will further increase the heat stability of the yellow iron oxide. The amount of alkali metal silicate or stannate added is about 0.3 to 5 wt.%, based on the yellow iron oxide.

Another alternate method of forming heat stable yellow iron oxide is to treat the yellow iron oxide with two hydrothermal treatments. An aqueous alkaline dispersion, comprising from about 30 to about 200 parts yellow iron oxide dispersed in about 1000 parts of an aqueous solution of alkali metal hydroxide having a concentration greater than 0.1 N and less than 10 N, and consisting preferably of sodium hydroxide, is subjected to a first hydrothermal treatment at a temperature from about 100° C. to about 240° C. for a time greater than ½ hour, preferably from about 1 to about 4 hours. The solid phase of the resultant product is separated from the liquid phase, and the solid phase is then dispersed in about 500 parts water. Added then to this aqueous dispersion is an aqueous solution of a soluble compound of antimony, the antimony solution prepared in the same manner and same concentration as mentioned previously. The resultant mixture is then diluted with water until the amount of water added is between 1.5 and 2.5 times the volume of the mixture prior to dilution. The solid phase of this diluted dispersion is separated from the liquid phase, and the recovered solid phase is then dispersed in about 200 to about 400 parts water and subjected to a second hydrothermal treatment at a temperature from about 100° C. to about 350° C. for a time greater than ½ hour, preferably from about 1 to about 4 hours.

The heat stability of yellow iron oxide under dual hydrothermal treatment is increased by adding the following to the recovered solid phase after the first hydrothermal treatment: an aqueous solution of ferric sulfate, an aqueous solution of an antimony compound, and an aqueous solution of an alkali metal silicate or alkali metal stannate. The resultant dispersion has about 30 to about 200 parts solid phase, from about 1 to about 100 parts ferric sulfate, from about 20 to about 100 parts of the antimony equivalent of antimony trioxide, from about 5 to about 15 parts alkali metal hydroxide for each part of antimony trioxide used, and from about 0.3 to about 5 parts metal silicate or alkali metal stannate, per 1,000 parts water. The preferred compounds of antimony, alkali metal silicate, and alkali metal stannate are the same as mentioned previously.

The following description of a sample experiment will be explanatory of the present invention:

80 g of commercial yellow iron oxide (Mapico Yellow LL-XLO from Columbian Chemicals Co.) were dispersed in 500 ml of water, whereto were added further (a) 200 ml of an aqueous solution of sodium antimonate containing 3.9 g of antimonite as $Sb_2O_3$ and 39 g of NaOH, under agitation, and (b) the total volume of the mixture was made up to 2000 ml by diluting with water, with agitation continued for 10 minutes, at ambient temperature, and preferably below 100° C.

A treated pigment of yellow iron oxide was obtained after washing and drying. This treated pigment was examined by X-ray diffraction. Diffraction lines intrinsic for antimony-bloom, in addition to the lines for yellow iron oxide, were confirmed. The chemical analysis of this treated pigment showed a constant of $Sb_2O_3$ in the amount of 1.77%, while the electron microscopic observation thereof had shown no other particle than yellow iron oxide. From this, it is assumed that antimony-bloom is present as the skin layer of the treated yellow iron oxide. We believe that dilution of the reaction mixture led to hydrolysis of the antimonite, forming colloidal antimony hydroxide or a precipitate of $Sb_2O_3$.

Thermal analyses of the pigment before and after the treatment, using a thermal analysis instrument of Model TG-DCS of Rigaku-Denki K.K. under the conditions given as:
 Amount of sample: 11.5 mg
 Standard substance: $\alpha$-$Al_2O_3$
 Rate of increase of temperature: 10° C./min.
 Atmosphere: air showed that the extrapolated starting temperature for the endothermic peak due to the dehydration reaction of yellow iron oxide was shifted from 220° C. in the untreated state to 245° C. after the treatment, so that the heat stability was increased by 25° C. From this fact, it was theorized that the particle of yellow iron oxide had been covered uniformly by antimony-bloom.

Next, in this explanatory experiment, 20 g of the treated yellow iron oxide coated with antimony-bloom were dispersed in 100 ml of pure water, and the dispersion was charged to a 250 ml stainless steel autoclave for a hydrothermal treatment at 250° C. for 7 hours. The hydrothermal treatment was carried out at the saturation vapor pressure of water at 250° C., corresponding to about 40 kg/cm². After this treatment, the contents of the autoclave were withdrawn, and a product of treated pigment was obtained after washing and drying. This treated pigment was examined by X-ray diffraction and chemical analysis. It was shown that no diffraction line other than yellow iron oxide was detected in the X-ray diffraction chart, and thus the diffraction lines intrinsic for antimony-bloom had disappeared, while an $Sb_2O_3$ content equivalent to that before the treatment was confirmed.

Therefore, it was concluded that, by this treatment, either (1) antimony had diffused into the crystal lattices of yellow iron oxide to form a solid solution of ferric/antimonite system, or (2) a reaction between antimony-bloom and yellow iron oxide had occurred to form a solid solution or compound of the ferric/antimonite system.

We believe, in either case, that a (FeSb)OOH solid solution exists and is the reason for the improved heat stability.

By conducting a thermal analysis of the above product, it was confirmed that the extrapolated starting temperature for the endothermic peak lay at 245° C. before the treatment and at 301° C. after the treatment. Thus, a further improvement of heat resistance of 56° C. was obtained.

From the above, it is clear that the effect upon the improvement of heat stability of yellow iron oxide pigment is greater where a compound or solid solution of iron/antimony basis is formed over the particle surface of the pigment than for the mere coating thereof with antimony-bloom.

EXAMPLE 1

Using agitation, 40 g of commercial yellow iron oxide Mapico Yellow LL-XLO from Columbian Chemicals Co.) were dispersed in 500 ml of water, followed by the addition of 200 ml of an aqueous solution of sodium antimonite, containing 4 g of antimonite as $Sb_2O_3$ and 40 g of NaOH. The total volume of the mixture was increased to 2000 ml by the addition of water, with agitation continued for an additional 10 minutes. The dilution ranges from about 1.2 to about 5 (vols./original vol.), preferably about 1.5 to 2.5. After filtration, washing, and drying, a yellow iron oxide pigment whose particle surface was coated with antimony-bloom was obtained.

Thermal analyses of the pigment, conducted before and after the treatment using a thermal analysis instrument of Model TG-DSC of Rigaku-Denki K.K. under the conditions given above for the sample experiment, showed that the extrapolated starting temperature for the endothermic peak due to the dehydration reaction of yellow iron oxide was shifted from 220° C. of untreated state to 245° C. It was assumed that the particle of yellow iron oxide had been covered uniformly by antimony-bloom.

EXAMPLE 2

The antimony-bloom-coated yellow iron oxide pigment obtained in Example 1 was dispersed in 200 ml of pure water. This dispersion was charged to a 500 ml stainless steel autoclave and was subjected to a hydrothermal treatment at 260° C. for 1 hour. After the hydrothermal treatment, the contents of the autoclave were withdrawn, washed with water, and dried to obtain a product of hydrothermally treated pigment.

The extrapolated starting temperature of endothermic peak determined by TG-DSC was found to be 220° C. for the untreated commercial yellow iron oxide and 295° C. for the hydrothermally-treated pigment, corresponding to an improvement in the heat resistance of 75° C.

EXAMPLE 3

40 g of antimony-bloom-coated yellow iron oxide pigment, as obtained in Example 1, were dispersed in 200 ml of an aqueous solution of sodium silicate having a concentration of 1 g/l, based on $SiO_2$. This dispersion was charged to a stainless steel autoclave, for hydrothermal treatment at 270° C. for 3 hours. After the treatment, the contents of the autoclave were withdrawn, washed with water, and dried to obtain a product of hydrothermally-treated pigment.

The extrapolated starting temperature of endothermic peak determined by TG-DSC was found to be 220° C. for the untreated commercial yellow iron oxide and 304° C. for the pigment hydrothermally treated in the presence of silicate, corresponding to an improvement of the heat stability of 84° C.

EXAMPLE 4

To an aqueous dispersion of 40 g. of commerical yellow iron oxide in 500 ml. of water was added 4.5 g. of $Fe_2(SO_4)_3$. Then 4 g. $Sb_2O_3$ were dissolved in 100 ml of an aqueous solution of caustic soda (concentration of 400 g/l), and the solution was diluted to 200 ml. The $Fe_2(SO_4)$—$\alpha$—FeOOH slurry was mixed with the antimonite solution, with stirring, and this mixture was charged to a stainless steel autoclave for a hydrothermal treatment of 180° C. for 3 hours. After the treatment, the contents of the autoclave were withdrawn, filtered, washed with water, and dried to obtain a product of hydrothermally-treated pigment.

This hydrothermally-treated pigment was examined by electron microscope and X-ray diffraction. No crystal other than yellow iron oxide was detected. The extrapolated starting temperature of the endothermic peak determined by TG-DSC was found to be 220° C. for the untreated iron oxide and 289° C. after the treatment, corresponding to an improvement in heat resistance of 69° C.

EXAMPLE 5

40 g of commercial yellow iron oxide were dispersed in 500 ml of an aqueous solution of ferric sulfate of a concentration of 18 g/l based on $Fe_2(SO_4)_3$. To this dispersion were added 200 ml of an aqueous solution of sodium antimonite containing 20 g/l of antimonite as $Sb_2O_3$ and 200 g/l of soda as NaOH. After a further addition thereto of 20 ml of an aqueous solution of sodium silicate having a concentration of 20 g/l as $SiO_2$, the mixture was charged to a stainless steel autoclave for a hydrothermal treatment at 200° C. for 3 hours. After the treatment, the contents of the autoclave were withdrawn, washed with water, and dried to obtain a product of treated pigment.

The extrapolated starting temperatures of endothermic peak before and after the treatment determined by TG-DSC were found to be 200° C. and 294° C., respectively, corresponding to an improvement in the heat resistance of 74° C.

EXAMPLE 6

40 g of commercial yellow iron oxide were dispersed in 500 ml of aqueous solution of ferric sulfate of a concentration of 18 g/l based on $Fe_2(SO_4)_3$. To this dispersion, there were added 200 ml of an aqueous solution of sodium antimonite containing 20 g/l of antimonite as $Sb_2O_3$ and 200 g/l of soda as NaOH. After a further addition of 200 ml of an aqueous solution of sodium stannate having a concentration of 2 g/l as $SnO_2$, the mixture was charged to a stainless steel autoclave for a hydrothermal treatment at 200° C. for 3 hours. After the treatment, the contents of the autoclave were withdrawn, washed, and dried to obtain a product of treated pigment.

The extrapolated starting temperatures of endothermic peak before and after the treatment determined by TG-DSC were found to be 200° C. and 293° C., respectively, corresponding to an improvement in the heat resistance of 73° C.

EXAMPLE 7

40 g of yellow iron oxide pigment were subjected to a hydrothermal treatment at 190° C. for 3 hours in 500 ml of 1 N aqueous NaOH. The solid phase was separated and dispersed in 500 ml of water to form an aqueous dispersion. The aqueous dispersion was treated with a sodium antimonite solution (to form a coating of antimony-bloom, as in Example 1), and then water was added so as to increase the total volume of the mixture to 2,000 ml. The solid phase of the resultant mixture was then dispersed in 200 ml of water, and this dispersion was charged to an autoclave for a hydrothermal treatment at 260° C. for 1 hour. The product obtained after water wash and drying showed an extrapolated starting temperature of endothermic peak determined by TG-DSC of 306° C., corresponding to an improvement in the heat resistance of 11° C., as compared with the temperature of 295° C. for the yellow iron oxide obtained in Example 2.

The concentration of the NaOH used is not critical, but it should not be greater than about 10 N, in order to maintain a reasonable pH upon dilution and to reduce corrosion of equipment.

EXAMPLE 8

A hydrothermally treated pigment, obtained by subjecting commercial yellow iron oxide to a hydrothermal treatment at 190° C. for 3 hours in 1 N NaOH solution, as in the first four lines of Example 7, was used as the starting material for a procedure as in Example 5.

The extrapolated starting temperature of endothermic peak of the so-obtained product determined by TG-DSC was found to be 305° C., corresponding to an improvement in the heat resistance of 11° C. as compared with the 294° C. temperature for the yellow iron oxide obtained in Example 5.

COMPARISON EXAMPLE 1

In accordance with the method disclosed in Japanese Patent Publication No. 16531/1974, a treated pigment was prepared in the following manner:

80 g of commercial yellow iron oxide was dispersed in 500 ml of pure water and thereto were further added 200 ml of an aqueous solution of sodium antimonite containing 20 g/l of $Sb_2O_3$ and 200 g/l of NaOH. The mixture was charged to an autoclave for a hydrothermal treatment at 200° C. for 3 hours under agitation. After the treatment, the contents of the autoclave were withdrawn, washed, and dried to obtain a product of treated pigment.

The extrapolated starting temperatures of endothermic peak before and after the treatment, determined by TG-DSC, were found to be 200° C. and 248° C., respectively, corresponding to an improvement in the heat resistance of 28° C., which is nearly comparable to that obtained in Example 1 without hydrothermal treatment and is lower than those in Examples 2 to 6.

COMPARISON EXAMPLE 2

A treatment similar to that of Comparison Example 1 was carried out at a higher hydrothermal treatment temperature of 210° C. in which a part of the yellow iron oxide was converted to red iron oxide. From this, it was deduced that the decomposition temperature of this commercial yellow iron oxide in hot water lay at 200° to 210° C.

We claim:

1. The preparation of a heat stable yellow iron oxide pigment, comprising:
   (a) forming an aqueous dispersion of yellow iron oxide ($\alpha$-FeOOH), the dispersion having the approximate composition of about 30 to about 200 parts yellow iron oxide per 1,000 parts water,
   (b) adding thereto an aqueous alkaline solution of a soluble compound of antimony from the group consisting of sodium antimonite, potassium antimonite, $SbCl_3$, $SbF_3$ and $Sb_2(SO_4)_3$, the solution having the approximate composition of the antimony equivalent of about 0.03 to 20 parts antimony trioxide, about 40 to 80 parts alkali metal hydroxide, and about 400 parts water,
   (c) diluting the resultant mixture, the diluting volume ranging from about 1.2 to about 5 volumes per original volume of mixture,
   (d) separating the resultant produce into a solid phase and an aqueous phase, and
   (e) recovering the solid phase.

2. The preparation of claim 1 wherein:
   (a) the alkali metal hydroxide is sodium hydroxide,
   (b) the soluble antimony compound is an alkali metal salt of antimony,
   (c) the reaction temperature is less than 100° C.,
   (d) the amount of dilution water added is between about 1.5 and 2.5 times the volume of the mixture prior to dilution, and
   (e) the weight % of antimony compound mixed with alkali metal hydroxide is from about 0.1 to about 10, calculated as $Sb_2O_3$.

3. The preparation of claim 2 wherein:
   (a) the alkali metal salt of antimony is sodium antimonite, and
   (b) the weight % of antimony compound mixed with alkali metal hydroxide is from about 0.5 to about 5, calculated as $Sb_2O_3$.

4. The preparation of a heat stable yellow iron oxide pigment comprising:
   (a) forming an aqueous dispersion of yellow iron oxide ($\alpha$-FeOOH), the dispersion having the approximate composition of about 30 to about 200 parts yellow iron oxide per 1,000 parts water,
   (b) adding thereto an aqueous alkaline solution of a soluble compound of antimony from the group consisting of sodium antimonite, potassium antimonite, $SbCl_3$, $SbF_3$ and $Sb_2(SO_4)_3$, the solution having the approximate composition of the antimony equivalent of about 0.3 to 20 parts antimony trioxide, about 40 to 80 parts alkali metal hydroxide, and about 400 parts water,
   (c) diluting the resultant mixture, the diluting volume ranging from about 1.2 to about 5 volumes per original volume of mixture,
   (d) separating the resultant product into a solid phase and an aqueous phase,
   (e) forming an aqueous dispersion of the solid phase, the dispersion having the approximate composition of about 200 parts solid phase per 1,000 parts water,
   (f) subjecting the dispersion to a hydrothermal treatment, at a temperature of from about 100° C. to about 350° C., for a time greater than ½ hour, and
   (g) recovering the solid product of treatment.

5. The preparation of claim 4 wherein:
   (a) the alkali metal hydroxide is sodium hydroxide,
   (b) the soluble compound of antimony is an alkali metal salt of antimony,
   (c) the temperature of the reaction involving iron oxide and the antimony solution is between ambient and 100° C.,
   (d) the amount of dilution water added is between 1.5 and 2.5 times the volume of the mixture prior to dilution,
   (e) the weight percent of antimony compound mixed with iron oxide is between about 0.1 and 10, calculated as $Sb_2O_3$,
   (f) the time of the hydrothermal treatment is from about 1 to about 3 hours, and
   (g) sodium silicate or sodium stannate is added to the dispersion, in an amount of from about 0.3 to about 5 wt.%, based on iron oxide, prior to the hydrothermal treatment.

6. The preparation of claim 5 wherein:
   (a) the alkali metal salt of antimony is sodium antimonite, and
   (b) the weight % of antimony compound mixed with iron oxide is from about 0.5 to about 5, calculated as $Sb_2O_3$.

7. The preparation of a heat stable yellow iron oxide pigment, comprising:
   (a) forming an aqueous slurry of yellow iron oxide ($\alpha$-FeOOH), a soluble ferric salt selected from the group consisting of ferric chloride, ferric nitrate, ferric oxalate, and ferric thiocyanate, an alkali metal hydroxide, and a soluble compound of antimony from the group consisting of sodium antimonite, potassium antimonite, $SbCl_3$, $SbF_3$ and $Sb_2(SO_4)_3$, with the approximate composition of the slurry being about 30 to 200 parts yellow iron oxide, from about 1 to about 100 parts ferric salt, about 20 to 100 parts of the antimony equivalent of antimony trioxide, and about 5 to 15 parts alkali metal hydroxide for each part of antimony trioxide used, per 1,000 parts water,
(b) subjecting the resultant mixture to a hydrothermal treatment carried out at a temperature of from about 100° C. to about 240° C., for a time greater than ½ hour,
(c) separating the resultant product into a solid phase and a liquid phase, and
(d) recovering the solid phase.

8. The preparation of claim 7, wherein:
(a) the soluble ferric salt is ferric sulfate,
(b) the alkali metal hydroxide is sodium hydroxide,
(c) the soluble antimony compound is an alkali metal salt of antimony, and
(d) a soluble alkali metal silicate or alkali metal stannate is added in an amount of about 0.3 to 5 wt.% based on the iron oxide to the slurry before the hydrothermal treatment.

9. The preparation of claim 8, wherein:
(a) the alkali metal silicate is sodium silicate, and the alkali metal stannate is sodium stannate,
(b) the amount of antimony compound used, calculated as $Sb_2O_3$, varies from about 35 to about 150 wt.%, based on ferric sulfate,
(c) the time of the hydrothermal treatment treatment ranges from about 1 to about 4 hours, and
(d) the alkali metal salt of antimony is sodium antimonite.

10. The preparation of a heat stable yellow iron oxide pigment comprising:
(a) forming an aqueous alkaline dispersion of about 30 to about 200 parts of yellow iron oxide ($\alpha$-FeOOH) in 1,000 parts of an aqueous solution of an alkali metal hydroxide having a concentration of greater than 0.1 N and less than 10 N,
(b) subjecting the alkaline dispersion to a first hydrothermal treatment, at a temperature of from about 100° C. to about 240° C., for a time greater than ½ hour,
(c) separating the resultant product into a solid phase and an aqueous phase,
(d) adding about 500 parts of water to the solid phase to form an aqueous dispersion,
(e) adding to the aqueous dispersion an aqueous alkaline solution of a soluble compound of antimony from the group consisting of sodium antimonite, potassium antimonite, $SbCl_3$, $SbF_3$ and $Sb_2(SO_4)_3$, the alkaline solution having the antimony equivalent of about 0.03 to 20 parts antimony oxide, about 40 to 80 parts alkali metal hydroxide, and about 400 parts water,
(f) diluting the resultant mixture,
(g) separating the diluted dispersion into a solid phase and an aqueous phase and then recovering the solid phase,
(h) adding to the solid phase about 200 to about 400 parts water and subjecting the resultant dispersion to a second hydrothermal treatment at a temperature of from about 100° C. to about 350° C., for a time greater than ½ hour,
(i) separating the product of the treatment into a solid phase and an aqueous phase, and
(j) recovering the solid phase.

11. The preparation of claim 10 wherein:
(a) the concentration of alkali metal hydroxide, is about 1 N,
(b) the alkali metal hydroxide is sodium hydroxide,
(c) the soluble antimony compound is sodium antimonite,
(d) the first hydrothermal treatment is carried out for a time of between about 1 and 4 hours,
(e) the second hydrothermal treatment is carried out for a time between about 1 and 4 hours, and
(f) the amount of dilution water is between about 1.5 and 2.5 times the volume of the mixture prior to dilution.

12. The preparation of a heat stable yellow iron oxide pigment, comprising:
(a) forming a dispersion of about 30 to 200 parts yellow iron oxide ($\alpha$-FeOOH) in about 1,000 parts of an aqueous solution of an alkali metal hydroxide having a concentration of greater than 0.1 N and less than 10 N,
(b) subjecting this dispersion to a first hydrothermal treatment at a temperature of from about 100° C. to about 240° C., for a time greater than ½ hour,
(c) separating the treated product into a solid phase and an aqueous phase,
(d) forming a second dispersion of the solid phase from step (c) by adding thereto an aqueous solution of ferric sulfate, an aqueous alkaline solution of a soluble compound of antimony from the group consisting of sodium antimonite, potassium antimonite, $SbCl_3$, $SbF_3$ and $Sb_2(SO_4)_3$, and an aqueous solution of an alkali metal silicate or an alkali metal stannate, the dispersion having the approximate composition of from about 35 to about 200 parts solid phase, from about 1 to about 100 parts ferric sulfate, the antimony equivalent from about 20 to about 100 parts antimony trioxide, from about 5 to about 15 parts alkali metal hydroxide for each part of antimony trioxide used, and from about 0.3 to about 5 parts alkali metal silicate or alkali metal stannate, per 1,000 parts water,
(e) subjecting the resultant dispersion to a second hydrothermal treatment, at a temperature of from about 100° C. to about 350° C., for a time greater than ½ hour,
(f) separating the treated product into a solid phase and a liquid phase, and
(g) recovering the solid phase.

13. The preparation of claim 12, wherein:
(a) the concentration of alkali metal hydroxide is about 1 N,
(b) the alkali metal hydroxide is sodium or potassium hydroxide,
(c) the time of the first hydrothermal treatment is from about 1 to about 4 hours,
(d) the alkali metal silicate is sodium silicate,
(e) the alkali metal stannate is sodium stannate,
(f) the time of the second hydrothermal treatment is from about 1 to about 4 hours, and (g) the alkali metal salt of antimony is sodium antimonite.

14. A composition of $\alpha$-Fe(OOH) having at least a partial film or coating of (FeSb)OOH solid solution.

* * * * *